UNITED STATES PATENT OFFICE.

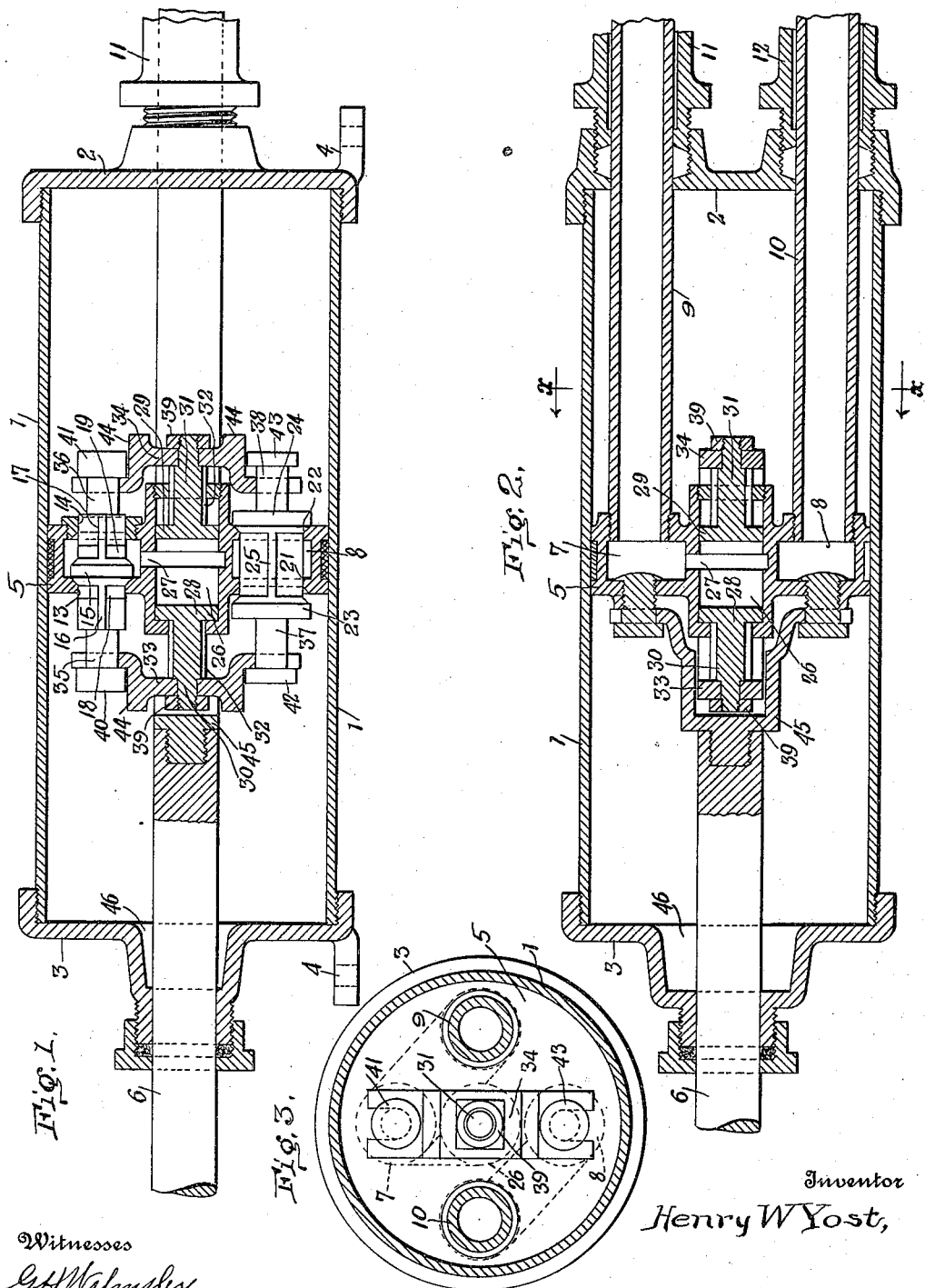

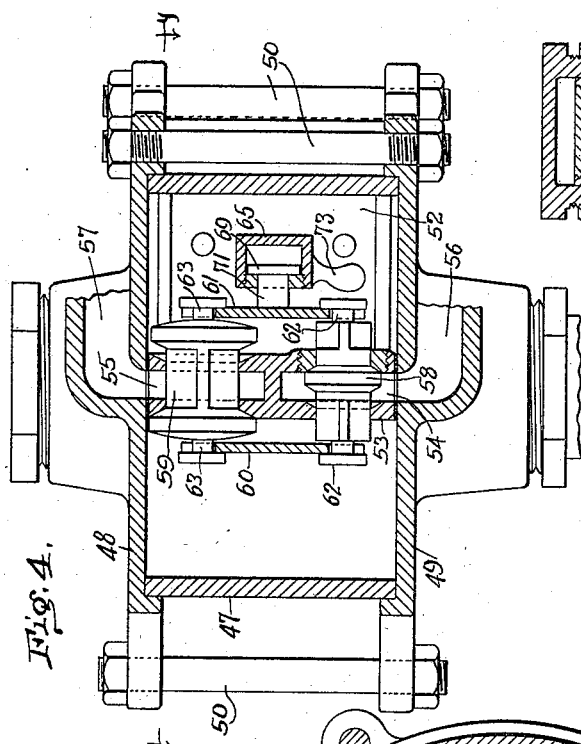
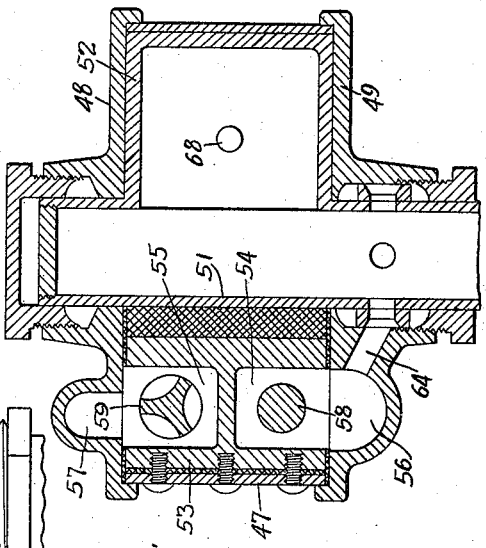
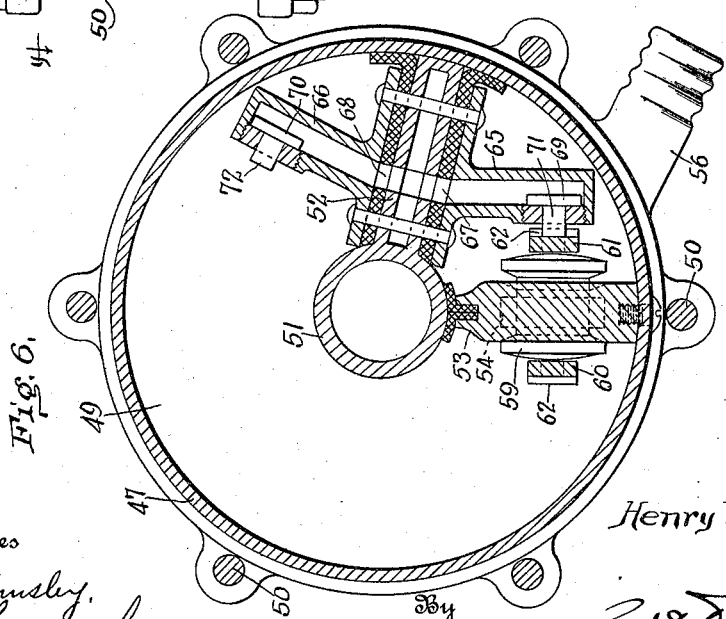

HENRY W. YOST, OF SPRINGFIELD, OHIO.

FLUID-MOTOR.

1,178,696.  Specification of Letters Patent.  Patented Apr. 11, 1916.

Application filed January 8, 1915. Serial No. 1,100.

*To all whom it may concern:*

Be it known that I, HENRY W. YOST, a citizen of the United States, residing at Springfield, in the county of Clark and State of Ohio, have invented certain new and useful Improvements in Fluid-Motors, of which the following is a specification, reference being had therein to the accompanying drawing.
This invention relates to fluid motors, and more particularly to valve operating mechanism designed especially for use in connection with water motors, and is the same as disclosed in an application for patent filed by me Nov. 7th, 1910, Ser. No. 591,003. Certain features including the valves and piston, etc., shown in this application are reserved and claimed in a co-pending application for patent filed by me Jany. 8th, 1915, Ser. No. 1099.

In water motors, and other fluid motors of a similar character, the valves are controlled primarily by the movement of the piston, but it is necessary to provide some auxiliary means for moving the valves across an intermediate position commonly known as the "dead center." Otherwise, when the valves have been moved into this intermediate position the water will simultaneously enter and escape from the motor on both sides of the piston, the pressure on the piston will become balanced, and, if the motor is operating under a dead load, the piston will immediately cease moving. The exact position occupied by the valves when this condition exists varies according to the load and the fluid pressure under which the motor is operating. It has been customary to provide springs for moving the valves across their dead centers, these springs being of such stiffness that they will be compressed before the valves are unseated, and, after the valves have been unseated by the movement of the piston, the springs will expand and move the valves across their dead centers. The use of springs for this purpose is not satisfactory. Principally because the same spring will not operate satisfactorily under all conditions of load and pressure, and, where a motor is built for use under unknown conditions it is necessary to equip the same with springs of average stiffness, which may or may not work satisfactorily when the motor is installed. Further, these springs rapidly deteriorate and often break necessitating the frequent renewal thereof.

The object of the present invention is to provide means for moving the valves of a fluid motor across dead center without the use of springs, and, to this end, to provide a fluid pressure operated device for actuating the valves.

It is a further object of the invention to provide such a device which will be connected with the same source of supply from which is derived the fluid for operating the motor; and to provide means connected with the inlet valve for completely cutting off the flow of fluid to the motor, thus causing substantially the entire pressure of the fluid to be exerted on the fluid-pressure-operated device, thereby actuating this device and shifting the valves; and further, to provide a mechanism of this character which will be very simple in its construction and operation, which may be built at a low cost, and which will be positive in its operation and will not easily get out of order.

In the accompanying drawings, Figure 1 is a sectional view, taken vertically of a reciprocating motor embodying the invention; Fig. 2 is a similar view taken horizontally of such a motor; Fig. 3 is a transverse, sectional view, taken on the line *x x* of Fig. 2 and looking in the direction of the arrows; Fig. 4 is a sectional view taken through the valve chambers of an oscillating motor embodying a modified form of the invention; Fig. 5 is a sectional view taken centrally of the motor shown in Fig. 4 and extending through the abutment; and Fig. 6 is a transverse, sectional view taken on the line *y y* of Fig. 4, and looking in the direction of the arrows.

In these drawings I have illustrated two embodiments of my invention showing the same, in the one instance, as applied to a reciprocating motor and, in the other instance, as applied to an oscillating motor. In Figs. 1 to 3 I have shown the invention as applied to a reciprocating water motor comprising a cylindrical body portion 1 having its opposite ends closed by cylinder heads 2 and 3, which are preferably screw-threaded to the ends of the cylinder and are provided with lugs or feet 4, by means of which the motor may be secured to a suitable support. Mounted in the cylinder is a piston 5, which, in the present instance, is movable relatively to the cylinder and is provided with a piston rod 6. In the particular form of the device illustrated in these figures both the valves and the valve operating mechanism are carried by the piston, and, to this end, the piston is provided with an inlet chamber 7 and an outlet or exhaust chamber 8. The inlet chamber 7 communicates with a suitable source of fluid supply, while the exhaust chamber communicates with the exhaust conduit. In the present instance both chambers are provided with lateral extensions to which are connected the ends of tubes 9 and 10 which extend through stuffing boxes in the cylinder head 2 and into pipes 11 and 12. The outer end of the pipe 11 may be connected with any source of fluid supply, and is usually connected by means of a flexible tube with a water faucet, while the pipe 12 is connected by a similar tubing with a waste pipe. The arrangement of the tubes 9, 10, 11 and 12 and their connections with the supply and exhaust are well known and require no detail illustration or explanation here. The inlet chamber 7 communicates with the interior of the cylinder 1 by ports 13 and 14 which are controlled by an inlet valve comprising a valve member 15 adapted to close either the port 13 or the port 14. This valve member has extending from the opposite sides thereof valve stems 16 and 17 which extend through the ports 13 and 14, respectively, and constitute guides and supports for the valve member 15. The stems 16 and 17 are preferably cruciform in cross section to permit the water to escape through the ports about the same. Suitable means are also connected with the inlet valve for simultaneously closing both the ports 13 and 14. This means may vary widely in its construction, but, as here shown, consists of laterally extending cylindrical portions 18 and 19 which, in the present instance, are provided by forming those portions of the valve stems 16 and 17 adjacent to the valve member 15 cylindrical and of such a diameter as to fit snugly within the respective ports. The lengths of the extensions 18 and 19 are such that when the valve 15 is in a central position the outer ends of the extensions will occupy positions with relation to their respective ports such as to interrupt the flow of fluid through these ports. Preferably the lengths of the parts are such that the one will enter its port at the instant the other clears its port. The exhaust chamber 8 communicates with the interior of the cylinder 1 by means of ports 21 and 22 which are controlled by a suitable exhaust valve. This valve is here shown as comprising two valve members 23 and 24 connected by a valve stem 25, all of a well known construction.

A suitable fluid pressure device is provided for actuating one or both of the valves. This device may be of any suitable character and preferably comprises a movable part operatively connected with one or both of the valves and having an exposed surface, a second movable part having a surface opposed to the exposed surface of the first-mentioned part and means for introducing fluid under pressure between said parts, whereby the movable parts will be actuated to shift the valves, the pressure of this fluid being preferably controlled by the valve, or one of the valves, to be actuated by the device. This fluid pressure device may be mounted in any suitable part of the motor and may be connected with the valves in any suitable manner, but, in the present instance, for the sake of compactness and simplicity, it has been mounted on the piston. As here shown the fluid-pressure-operated device comprises a supplemental cylinder 26 carried by the main piston 5, preferably formed integral therewith and arranged between the two valve chambers. This cylinder communicates with the source of fluid supply at a point in advance of the ports 13 and 14 of the inlet chamber, that is, at a point between the ports and the source of supply, thus enabling open communication to be maintained between the source of supply and the supplemental cylinder when the ports are closed. In the form of the device here shown the supplemental cylinder communicates at a point between its ends with the inlet chamber 7, this communication being by means of an open port 27. Mounted in the opposite ends of the cylinder 26 and on opposite sides of the inlet port 27 are pistons 28 and 29 having piston rods 30 and 31 which extend through the respective ends of the cylinder 26 and are preferably fluted, as shown at 32, to permit the escape of any fluid which may seep past the pistons. Each piston rod is operatively connected to the two valves, and, as here shown, these connections comprise cross heads 33 and 34 having their ends offset and slotted to receive pins 35 and 36, which extend outwardly from the stems 16 and 17 of the inlet valve, and pins 37 and 38 which extend from the opposite ends of the exhaust valve. Each of the pins 35, 36, 37 and 38 is provided with an enlarged head, and, when the device is in its assembled position, the movement of the cross heads relative to the respective valves is limited in one direction by the heads and in the other direction by the valves themselves. The cross heads may be secured to the piston rods in any suitable manner, but to facilitate the assembling of the device they are preferably formed separate therefrom and are adapted to be mounted on the reduced outer ends of the piston rods and to be secured thereon by means of nuts 39. The heads for the pins of the inlet valve, which are indicated at 40 and 41, are of a greater thickness than the heads of the pins for the exhaust valve, which are indicated at 42 and 43. As a result the pin for that stem of the inlet valve which is in advance of the main piston will extend beyond the corresponding end of the pin for the exhaust valve, as shown in Fig. 1. The cross heads are shown as provided with outwardly extending lugs 44 forming a part thereof and extending beyond the ends of the pins of the respective valves. The piston rod 6 of the main piston is preferably secured thereto by means of a yoke 45, to which the inner end of the piston rod is secured and which extends about the cross head 33 and is secured to the adjacent face of the piston 5 on the opposite sides of the cylinder 26. The cylinder head 3 has a recess 46 surrounding the piston rod 6 and shaped to receive the yoke 45.

With the parts in the position shown in Fig. 1 of the drawings the piston will be moving toward the cylinder head 3. As it approaches the cylinder head the lugs 44 of the cross head 33 will engage the inner face of the head and move the piston 28 inward. After the cross head has been moved inward a short distance the head 40 of the pin 35 of the inlet valve will engage the cylinder head and this valve will be unseated. The pin 37 of the exhaust valve being shorter than the pin 35 of the inlet valve the exhaust valve has not yet been unseated. Consequently, the fluid entering in the rear of the main piston, although reduced in quantity, will continue the movement of the piston toward the cylinder head 3 until the inlet valve has reached its central position, when both the ports 13 and 14 will be closed. As soon as these ports are closed the entire pressure of the motor fluid is exerted between the pistons 28 and 29. The cross head 33 of the piston 28 being in engagement with the cylinder head 3 this piston is held against movement, and, consequently, the piston 29 is subjected to substantially the entire pressure of the motor fluid and is thereby moved toward the end of the cylinder 26 carrying with it the cross head 34 which engages the heads 41 and 43 of the pins 36 and 38 of the inlet and exhaust valves, respectively, and carries these valves across their dead center positions, thereby positively shifting the same and reversing the flow of water to and from the main cylinder 1. As the piston approaches the cylinder head 2 the cross head 34 will engage the same and the valves will be operated in the same manner as above described, the piston 28, in this instance, being actuated by the fluid pressure.

Obviously, the invention is not limited to a reciprocating motor but is equally applicable to motors of other types. The mechanism above described could be transferred without material alteration to an oscillating motor, but, in Figs. 4 to 6, I have shown a modified form of the invention applied to an oscillating motor. The motor shown in these figures comprises the usual cylindrical body portion 47 closed at its opposite ends by the cylinder heads 48 and 49 which are connected one to the other by bolts 50. Journaled in the cylinder heads 48 and 49 is a shaft 51 having rigidly secured thereto a wing piston 52. In the present instance both the shaft and the piston are hollow. Mounted in the cylinder 47 between the wall thereof and the shaft 51 is a radial abutment 53 having formed therein inlet and exhaust chambers 54 and 55 communicating, respectively, with inlet and exhaust conduits 56 and 57. Inlet and exhaust valves 58 and 59 are mounted in the respective valve chambers. The construction of these valves is substantially the same as that of the valves above described in connection with the reciprocating motor. The valves are connected one to the other by means of bars or plates 60 and 61 having their ends slotted to engage headed pins 62 and 63 of the respective valves. The inlet valve chamber 54 is connected with the hollow shaft 51, preferably by means of a conduit 64 formed in the shaft bearing of the lower cylinder head 49. The hollow piston has two laterally extending hollow arms 65 and 66 communicating with the interior of the hollow piston by ports 67 and 68. Disk like pistons 69 and 70 are mounted in respective arms and have stems 71 and 72 extending through those sides of the arms adjacent to the abutment. Each arm is provided with a lug 73 adapted to engage the pin 62 on the adjacent end of the inlet valve.

With the parts in the position shown in Fig. 6 the arm 65 of the piston is approaching the abutment 53. As the movement of the piston continues the projection 73 from the arm will unseat the inlet valve and move the same to a central position, in which position the flow of fluid to the cylinder will be completely interrupted. Therefore, the pressure of the motor fluid will be exerted through the port 64, hollow shaft 51, piston 52 and arm 65 upon the piston 69, the stem of which will have engaged the plate 61 and have been moved inward. The pressure of the fluid on this piston will move the same outward, thereby moving the connecting plate 61 toward the abutment and simultaneously shifting the two valves.

While I have herein shown and described two forms of my invention it will be apparent that these two forms have been chosen for the purpose of illustration only and that the invention in its broader aspect and in its details of construction can be widely varied and the constructions herein shown entirely departed from; and further, that the invention is capable of application to fluid-operated motors of various kinds. I, therefore, wish it to be understood that I do not desire to be limited to the details of construction shown and described, for obvious modifications will occur to a person skilled in the art.

Having thus fully described my invention, what I claim as new and desire to protect by Letters Patent, is:

1. In a motor, the combination with inlet and exhaust passages, separate valves to control said passages, of a fluid operated valve shifting device supported independently of said valves and in operative relation to one of them, the operation of said valve shifting device being controlled by one of said valves.

2. In a motor, the combination with inlet and exhaust valves, of a fluid-operated valve-shifting device supported independently of said valves and in operative relation to both of them, the operation of said valve-shifting device being controlled by one of said valves.

3. In a motor, the combination with inlet and exhaust passages the former connected with a source of fluid supply, and a valve to control one of said passages, of a fluid-pressure operated device, and a connection between said device and said valve, said device being in direct communication with the source of fluid supply, and the pressure to which said device is subjected being controlled by said inlet valve.

4. In a motor, the combination with inlet and exhaust passages, and valves controlling said passages and capable of independent movement, of a fluid-operated valve shifting device supported independently of said valves and having operative relation to one of them, said valve-shifting device comprising a chamber normally in open communication with said inlet passage, and means to automatically control the pressure in said chamber.

5. In a motor, the combination with inlet and exhaust valves the former connected with a source of fluid supply, of a supplemental device operated by fluid pressure, and a positive connection between said device and both of said valves, said device being in direct communication with said source of fluid supply, and the pressure to which said device is subjected being controlled by said inlet valve.

6. In a motor, the combination with two inlet ports connected with a common source of fluid supply, and a valve adapted to close either or both of said ports, of a fluid pressure operated valve shifting device supported independently of said valve, said device being normally in open communication with said source of supply to cause the same to be operated by the pressure of the motor fluid when said valve is in a position to close both of said ports.

7. In a motor, the combination, with a cylinder, a piston, one of said parts having a valve chamber provided with two ports, and a valve having means to close either or both of said ports, of a fluid pressure operated device supported independently of said valve and in operative relation thereto, said device comprising a chamber normally in open communication with said valve chamber, and a movable part actuated by the pressure in said chamber, said pressure being controlled by the position of said valve.

8. In a motor, the combination with inlet and exhaust passages, each having two ports communicating with the interior of said motor, and double acting puppet valves to control the flow of fluid through the ports of the respective passages, one of said valves being constructed to close either or both of the ports of its passage, of a fluid pressure operated valve shifting device supported independently of said valve and comprising a fluid pressure chamber, the pressure in which is controlled by that valve which is adapted to close both ports of its passage.

9. In a motor, the combination, with a cylinder, a piston, one of said parts having two valve chambers, each provided with two ports, and inlet and exhaust valves mounted in the respective chambers, said inlet valve having means to close both ports of its chamber when it is in an intermediate position, of a fluid-pressure-operated device operatively connected with said valves and in open communication with said inlet valve chamber.

10. In a motor, the combination, with a cylinder, a piston having two valve chambers, one of said chambers communicating with the source of fluid pressure and the other of said chambers communicating with an exhaust conduit, each of said chambers having two ports, and inlet and exhaust valves mounted in the respective chambers, the inlet valve having means to close either or both of said ports, of a device supported independently of said valves, operated by fluid pressure to shift one of said valves and having communication with said source of fluid supply to cause it to be actuated when said inlet valve is in a position to close both of the ports of its chamber.

11. In a motor, the combination, with a cylinder, a piston having two valve chambers, one of said chambers communicating with a source of fluid pressure and the other of said chambers communicating with an exhaust conduit, each of said chambers having two ports, and inlet and exhaust valves mounted in the respective chambers, the inlet valve having means to close either or both of said ports, of a device operated by fluid pressure to positively actuate both of said valves and communicating with said source of fluid supply, whereby, when said inlet valve is in a position to close both of the ports of its chamber, said device will receive substantially the entire pressure of said fluid.

12. In a motor, the combination, with a cylinder, a piston having two valve chambers, one of said chambers communicating with a source of fluid pressure and the other of said chambers communicating with an exhaust conduit, each of said chambers having two ports, and inlet and exhaust valves mounted in the respective chambers, the inlet valve having means to close either or both of said ports, of a fluid pressure-operated device carried by said piston, operatively connected with one of said valves and communicating with said source of fluid supply, whereby, when said inlet valve is in a position to close both of the ports of its chamber, said device will receive substantially the entire pressure of said fluid.

13. In a motor, the combination, with a cylinder, a piston having two valve chambers, one of said chambers communicating with a source of fluid pressure and the other of said chambers communicating with an exhaust conduit, each of said chambers having two ports, and inlet and exhaust valves mounted in the respective chambers, the inlet valve having means to close either or both of said ports, of a device carried by said piston and operated by fluid pressure to positively actuate both of said valves, said device communicating with said source of fluid supply, whereby, when said inlet valve is in a position to close both of the ports of its chamber, said device will receive substantially the entire pressure of fluid.

14. In a motor, the combination with inlet and exhaust valves, and a valve shifting device comprising a part supported independently of and in operative relation to one of said valves and having an exposed surface, of a second part supported adjacent to the first-mentioned part and having a surface opposed to the exposed surface of said first-mentioned part, and means for introducing fluid under pressure between the said surfaces.

15. In a motor, the combination with inlet and exhaust valves, and two movable parts supported independently of said valves, operatively connected to the opposite ends of one of said valves and having opposed surfaces, of means for introducing fluid under pressure between said surfaces.

16. In a motor, the combination with inlet and exhaust valves, and two movable parts supported independently of said valves, operatively connected to the opposite ends of one of said valves and having opposed surfaces, of means for introducing fluid under pressure between said surfaces, and means for holding one of said parts against movement when said fluid is introduced between said surfaces.

17. In a motor, the combination with inlet and exhaust valves, and two movable parts supported independently of said valves, operatively connected to the opposite ends of one of said valves and having opposed surfaces, of means for unseating said valve and introducing fluid under pressure between said surfaces.

18. In a motor, the combination with inlet and exhaust valves, and two movable parts supported independently of said valves, operatively connected to the opposite ends thereof and having opposed surfaces, of means for unseating one of said valves and introducing fluid under pressure between said surfaces.

19. In a motor, the combination with inlet and exhaust valves, and two movable parts supported independently of said valves, operatively connected to the opposite ends thereof and having opposed surfaces, of means for unseating one of said valves and introducing fluid under pressure between said surfaces, and means for holding one of said parts against movement when said fluid is introduced between said surfaces.

20. In a motor, the combination, with a cylinder, a piston having a valve chamber communicating with a source of fluid supply, and a valve mounted in said valve chamber, of a valve-shifting device comprising two parts carried by said piston independently of said valve and having opposed surfaces, one of said parts being movable and supported in operable relation to said valve, and said device having means for introducing fluid under pressure between said parts.

21. In a motor, the combination, with a cylinder, a piston having a valve chamber communicating with a source of fluid supply, and a valve mounted in said valve chamber, of a valve shifting device having two parts carried by said piston independently of said valve and having opposed surfaces, one of said parts being movable and supported in operative relation to said valve, and said device having means for introducing fluid under pressure between said parts, said pressure being controlled by said valve.

22. In a motor, the combination, with a cylinder, a piston having a valve chamber communicating with a source of fluid supply, and a valve mounted in said valve chamber, of two movable parts carried by said piston independently of said valve, having opposed surfaces and operatively connected with said valve on opposite sides of said piston, means for introducing fluid under pressure between said parts, and means for holding one of said parts against movement when subjected to the pressure of said fluid.

23. In a motor, the combination, with a cylinder, a piston having two valve chambers communicating, respectively, with a source of fluid supply and with an exhaust conduit, and inlet and exhaust valves mounted in the respective valve chambers, of a valve shifting device comprising two parts carried by said piston and having opposed surfaces, one of said parts being movable and supported in operative relation to said valves, and means for introducing fluid under pressure between said parts.

24. In a motor, the combination, with a cylinder, a piston having two valve chambers communicating, respectively, with a source of fluid supply and with an exhaust conduit, and inlet and exhaust valves mounted in the respective valve chambers, of two movable parts carried by said piston, having opposed surfaces and operatively connected to the opposite ends of said valves, and means for introducing fluid under pressure between said parts.

25. In a motor, the combination with inlet and exhaust passages, each having two ports communicating with the interior of said motor, and double acting puppet valves to control the flow of fluid through the ports of the respective passages, one of said valves being constructed to close either or both of the ports of its passage, of a supplemental cylinder communicating with said source of fluid supply, and a piston mounted in said cylinder and having operative relation with one of said valves, the action of said piston being controlled by the valve which is adapted to close both ports of its passage.

26. In a water motor, the combination with inlet and exhaust passages connected with a source of fluid supply, and a valve to control one of said passages, of a supplemental cylinder in constant communication with said source of fluid supply, and a piston mounted in said cylinder and operatively connected with said valve, said valve controlling the action of said piston.

27. A water motor comprising a cylinder, and a piston having inlet and exhaust valve chambers, valves mounted in said chambers, a supplemental cylinder, a piston mounted in said cylinder, and means controlled by said piston for positively actuating both of said valves, the pressure of the fluid in said supplemental cylinder being controlled by said inlet valve.

28. The combination, with a motor comprising a cylinder having a fixed part, and a piston, one of said parts having a valve chamber communicating with a source of fluid supply and provided with two ports, and one of said parts having a supplemental cylinder also communicating with said source of fluid supply, of a valve mounted in said valve chamber, means to simultaneously interrupt the flow of fluid through both of said ports, a piston mounted in said supplemental cylinder, and means controlled by said piston to actuate said valve.

29. The combination, with a motor comprising a cylinder having a fixed part, and a piston, one of said parts having two valve chambers communicating, respectively, with a fluid supply and an exhaust conduit and each provided with two ports, inlet and exhaust valves mounted in the respective valve chambers, and means to simultaneously interrupt the flow of fluid through both of the ports of the inlet valve chamber, of a supplemental cylinder communicating with said fluid supply, a piston mounted in said cylinder, and means controlled by said piston for positively actuating both of said valves.

30. In a motor, the combination, with a cylinder, a piston mounted therein and having two valve chambers communicating, respectively, with a source of fluid supply and an exhaust conduit, inlet and exhaust valves mounted in the respective chambers, and means for simultaneously interrupting the flow of water through both ports of said inlet valve chamber, of a supplemental cylinder carried by said piston and communicating with said fluid supply, a piston mounted in said cylinder, and a connection between said piston and one of said valves.

31. In a motor, the combination, with a cylinder, a piston mounted therein and having two valve chambers communicating, respectively, with a source of fluid supply and an exhaust conduit, inlet and exhaust valves mounted in the respective chambers, and means for simultaneously interrupting the flow of fluid through both ports of said inlet valve chamber, of a supplemental cylinder carried by said piston communicating at a point between its ends with said inlet valve chamber, two pistons mounted in said supplemental cylinder on opposite sides of its point of communication with said inlet valve chamber and having piston rods extending beyond the ends of said cylinder, and connections between said piston rods and the adjacent ends of the two valves.

32. In a motor, the combination, with a cylinder, a piston mounted therein and having two valve chambers communicating, respectively, with a source of fluid supply and an exhaust conduit, inlet and exhaust valves mounted in the respective chambers, and means connected with said inlet valve for simultaneously interrupting the flow of fluid through both of the ports of said inlet valve chamber, of a supplemental cylinder carried by said piston and having a port between its ends connecting it with said inlet valve chamber, pistons mounted in said supplemental cylinder on opposite sides of said port, each piston having a piston rod extending through the adjacent end of said cylinder, and a cross head carried by each of said piston rods and connected with the adjacent ends of said inlet and exhaust valves.

33. In a motor, the combination, with a cylinder, a piston mounted therein and having two valve chambers communicating, respectively, with a source of fluid supply and an exhaust conduit, inlet and exhaust valves mounted in the respective chambers, and means connected with said inlet valve for simultaneously interrupting the flow of fluid through both of the ports of said inlet valve chamber, of a supplemental cylinder carried by said piston having a port between its ends connecting it with said inlet valve chamber, pistons mounted in said supplemental cylinder on opposite sides of said port, each piston having a piston rod extending through the adjacent end of said cylinder, a cross head carried by each of said piston rods and connected with the adjacent ends of said inlet and exhaust valves, and means to cause said inlet valve to be unseated before said exhaust valve is unseated.

34. In a motor, a combination comprising a part having a chamber communicating with a source of fluid supply and also communicating with the interior of said motor, a fluid-pressure operated valve-shifting device communicating with said source of fluid supply and having a movable part normally subjected to pressure which is always in a direction to operate said device, and means to interrupt the communication between said chamber and the interior of said motor, whereby said valve-shifting device is subjected to operating pressure.

35. In a motor, a cylinder and a piston, one of said parts having an inlet chamber connected with the source of fluid supply and provided with two ports leading to the interior of said cylinder, of fluid-pressure operated valve-shifting devices communicating with said source of fluid supply in advance of said ports and having a movable part normally subjected to pressure which is always in a direction to operate the same, and means to simultaneously close both of said ports, and interrupt the flow of fluid from said inlet chamber to said cylinder, whereby said valve-shifting device is subjected to an operating pressure.

36. In a motor, a cylinder, a piston mounted in said cylinder and having inlet and exhaust chambers, valves mounted in said chambers, a valve actuating device carried by said piston, a yoke secured to said piston and extending about said device, and a piston rod secured to said yoke.

37. In a motor, a cylinder, a piston mounted in said cylinder and having inlet and exhaust chambers, valves mounted in said chambers, projections extending from the ends of said valves and provided at their ends with enlarged heads, a valve actuating device carried by said piston and comprising a movable part, a cross head detachably secured to said movable part and having slotted ends adapted to engage the projections from said valves, a yoke secured to said piston and extending about said cross head, and a piston rod secured to said yoke.

38. In a motor, a casing comprising a cylinder, and cylinder heads, one of said cylinder heads having a recess therein, a piston mounted in said cylinder and having inlet and exhaust chambers, valves mounted in said chambers, a valve actuating device carried by said piston, a yoke secured to said piston, extending about said valve actuating device and arranged in alinement with the recess in said cylinder head, and a piston rod extending through said cylinder head and connected with said yoke.

39. In a motor having inlet and exhaust passages, valves to control said passages, and a fluid-pressure operated valve-shifting device supported independently of said valves and operatively connected thereto, the operation of said valve-shifting device being controlled by the position of one of said valves.

40. In a motor having inlet and exhaust passages and connected with a source of fluid supply and a valve to control one of said passages, a fluid-pressure operated valve-shifting device supported independently of said valve, operatively connected therewith, communicating with said source of fluid supply and having a movable part supported normally in a position to receive pressure from said source of fluid supply which pressure is always in a direction to operate said device, the pressure to which said part is subjected being controlled by said valve.

41. In a motor having inlet and exhaust passages and connected with a source of fluid supply, valves to control said passages, a fluid-pressure-operated valve-shifting device supported independently of said valves, operatively connected thereto and communicating with said source of fluid supply, the pressure to which said device is subjected being controlled by one of said valves.

42. In a motor having two inlet ports connected with a common source of fluid supply, a valve adapted to close either or both of said ports, a fluid-pressure-operated device supported independently of said valve, operatively connected thereto and normally in open communication with said source of fluid supply, whereby, when said valve is in a position to close both of said ports, said device is subjected to substantially the full pressure of the motor fluid.

43. In a motor, a part having a chamber connected with a source of fluid supply and communicating with the interior of said motor, means for interrupting communication between said chamber and the interior of said motor, and a fluid-pressure operated valve-shifting device supported independently of the means for interrupting communication between said chamber and the interior of said motor, said device being connected with said source of fluid supply and having a movable part normally subjected to pressure which is always in a direction to operate said device and adapted to be actuated when said communication is interrupted.

44. In a motor having a fixed part and a piston part, one of said parts having inlet and exhaust ports provided with valve seats, inlet and exhaust valves arranged to engage the respective valve seats, a valve shifting device adapted to be moved in one direction by fluid pressure, and means for moving said valve shifting device in the other direction, interrupting the flow of fluid to both sides of said piston and unseating said exhaust valve, these operations taking place in the order named.

In testimony whereof I affix my signature in presence of two witnesses.

HENRY W. YOST.

Witnesses:
W. B. BAUER,
CHAS. P. MOSHER.

Copies of this patent may be obtained for five cents each, by addressing the "Commissioner of Patents Washington, D. C."